W. M. MURPHY & J. J. REDNER.
INSECT TRAP.
APPLICATION FILED APR. 23, 1913.

1,135,710.

Patented Apr. 13, 1915.

Witnesses:
J. Hilary Bouillon.
Gerald E. Terwilliger.

William M. Murphy
John J. Redner
Inventors

By their Attorney
Edward Davis

UNITED STATES PATENT OFFICE.

WILLIAM M. MURPHY AND JOHN J. REDNER, OF NEW YORK, N. Y.; SAID MURPHY ASSIGNOR, BY MESNE ASSIGNMENTS, TO THE U. S. MANUFACTURERS' DISTRIBUTING COMPANY, INC., OF NEW YORK, N. Y., A CORPORATION OF NEW YORK.

INSECT-TRAP.

1,135,710.   Specification of Letters Patent.   Patented Apr. 13, 1915.

Application filed April 23, 1913. Serial No. 762,996.

*To all whom it may concern:*

Be it known that we, WILLIAM M. MURPHY and JOHN J. REDNER, citizens of the United States, residing in the city, county, and State of New York, have invented certain new and useful Improvements in Insect-Traps, of which the following is a specification.

Our invention relates to a device for entrapping flies or other insects and contemplates certain improvements in the structure illustrated and described in the prior United States patent granted to John J. Redner, No. 831,098, dated September 18, 1906.

Figure 1:
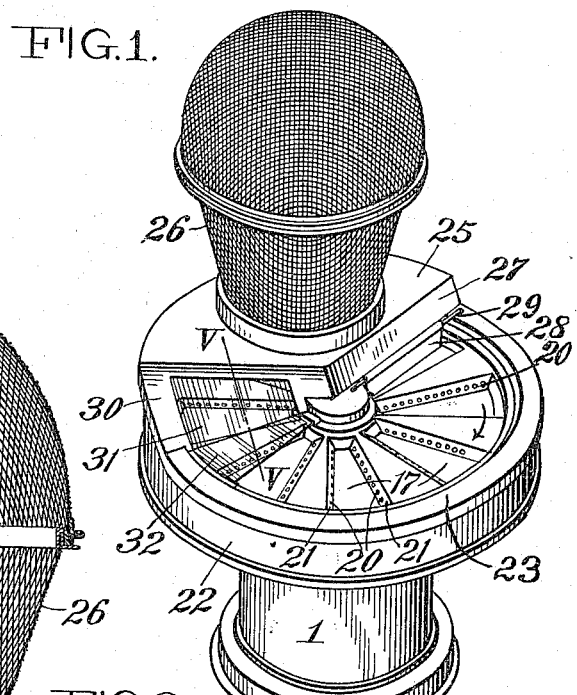
Figure 2:
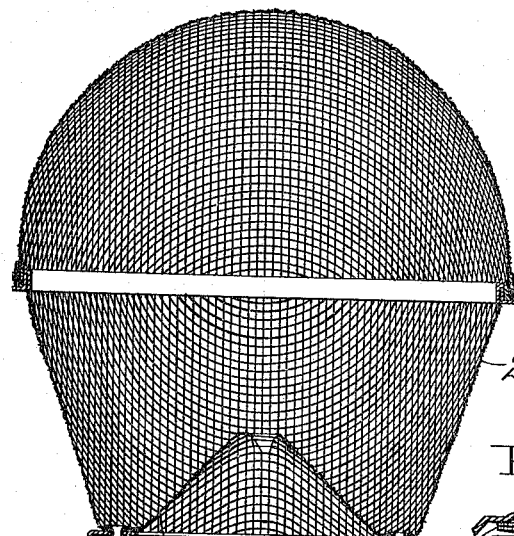
Figure 3:
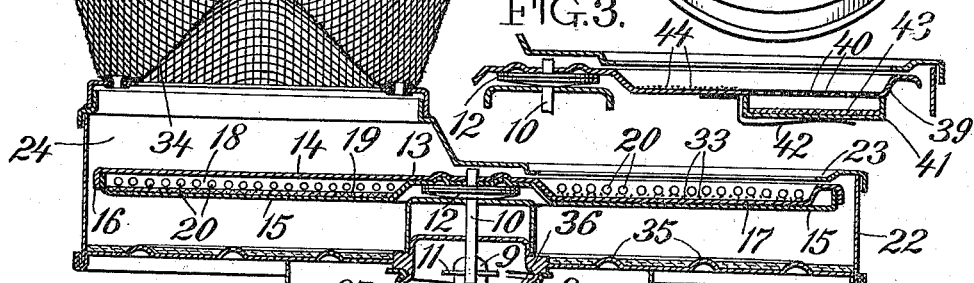
Figures 4, 5:
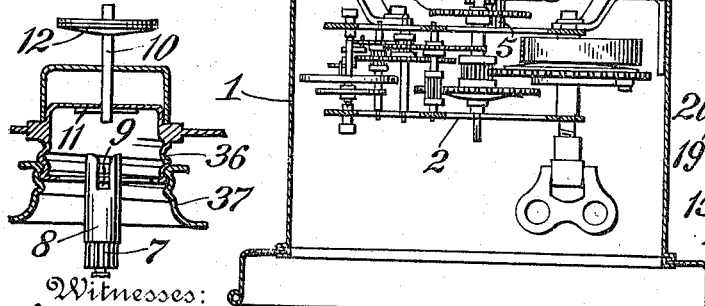

In the accompanying drawings which form a part of this specification, Figure 1 is a perspective view of our improved trap; Fig. 2 is a transverse sectional view thereof; Fig. 3 is a fragmentary transverse sectional view showing a modification; Fig. 4 is a transverse sectional view illustrating the communication between the driving mechanism and the driven member; Fig. 5 is a transverse sectional view on line V—V of Fig. 1.

Referring to the drawings in detail, the numeral 1 designates a base in which is housed the clockwork 2 provided with a main driving gear 3 mounted on the arbor 4. The gear 3 meshes with a gear 5 on a countershaft carrying the gear 6, which in turn drives the gear 7 on the spindle 8, which is loosely mounted on the arbor 4. The spindle is slotted at 9 for the reception of a shaft 10 and arm 11, this construction forming a driving connection between the spindle and the shaft. The shaft 10 carries on its upper extremity a disk 12, upon the upper surface of which normally rests the rotatable member 13, which is preferably composed of two plates 14 and 15 adapted to be placed one on top of the other and held together by means of the annular flange 16 about the periphery of the plate 14. The friction between the disk and the plates is sufficient to transmit rotation from the former to the latter, since the plates are otherwise free to revolve.

The plate 14 is provided with a number of depressed sections 17, as best illustrated in Fig. 1. It will be observed that between these depressed portions are formed compartments 18 which are adapted to contain blotting paper 19, or other absorbent material that may be saturated with a substance whose odor is attractive to flies and other insects. In order to permit the escape of the odor, holes 20 are pierced through the inclined walls 21 of the depressed portions.

The entire member 13 is adapted to revolve with the shaft 10 within a casing 22 provided with a circular flange 23 overlapping the outer edge of the member 13 through a considerable arc of its periphery. One side of the casing 22 is enlarged to form the chamber 24, upon the upper wall 25 of which is mounted the two-part dome-shaped wire basket 26. Adjacent to one wall 27 of the enlarged portion of the casing is mounted a flap 28 hinged to a pintle 29. The adjacent inclined wall 30 is provided with a window 31 of glass or other translucent but not necessarily transparent material which has a horizontal section 32 mounted close to the upper portions of the plate 14, as best seen in Figs. 1 and 5.

In the operation of the device the setting in motion of the clockwork will cause the disk 13 to revolve slowly in the direction of the arrow in Fig. 1. Flies or other insects will be attracted to the upper surface of the revolving disk either by the odor emanating from the holes 20 or by sugar or other sweet substance 33 placed on the bottom of the depressed sections 17. The motion of the disk is so slow that the insect is not frightened by it, although the continued rotation gradually brings it under the translucent member 32. The fact that this is translucent further prevents the liability of the insect being frightened away, and eventually the parts come into the position shown in Fig 5. By this time the insect usually takes alarm and flies up into the space 24 toward the light which comes through the wire dome. Searching for means of exit, the insect passes through the cone-shaped barrier 34, which admits it to the upper portion of the dome member, but prevents its return. In case the insect does not leave the plate 14 it will eventually be brushed therefrom by means of the flap 28 as the disk member continues to rotate.

In order to form an atmosphere within the trap that will be still more attractive to the fly or other insect, any heavy, semi-liquid odoriferous material, such as heavy molasses or honey, may be placed in the bottom of the casing in which the disk rotates. To prevent the flow of the liquid, in case the device it not placed level, a number of annular ridges 35 may be formed in the bottom of the casing as shown in Fig. 2.

In order to permit the ready disassembling of the members, the casing 22 is attached to its pedestal by means of the screw-threaded member 36, the threads on which are adapted to engage corresponding threads on the neck 37 of the partition 38 mounted in the pedestal. When the members are disengaged by unscrewing the threads no harm can come to the driving mechanism, since the shaft 10 and the driving connection provided at its lower end may be lifted clear of the spindle 8, as shown in Fig. 4.

In Fig. 3 we have shown a modification in which the revolving disk is formed of a single plate 39 similar to the plate 14, except that it is provided with holes 40 in the bottom of the depressed sections. Beneath the holes in each depressed section is mounted a container 41 adapted to be held in place by a spring clip 42. This container may be provided with a sheet of blotting paper 43 or other absorbent material for accomplishing the same purpose as the material 19 in the form already described. Sugar or other enticing substance 44 may be sprinkled on a part of the bottom of the depressed section not occupied by the holes.

While we have illustrated and described only certain specific embodiments of our device, we realize that our invention is capable of broader application, and we do not desire to be limited to the precise structure shown and described.

Having thus described our invention, we claim:

1. In an insect trap, a rotatable disk, means for rotating the same, a housing inclosing a segment of said disk and having a portion extending entirely under the lower surface thereof, and an annular flange on said housing overlapping the exposed portion of said disk and in close proximity thereto.

2. In an insect trap, a rotatable member comprising a plurality of superposed disks adapted to form a plurality of compartments for insect enticing substance, said compartments communicating with the exposed surface thereof, and means for rotating said member and a housing inclosing a segment of said member.

3. In an insect trap, a rotatable member comprising a plurality of superposed disks, one of said disks having depressed portions engaging the other disk and forming a plurality of compartments therewith, means of communication of said compartments with the atmosphere, and means for rotating said member and a housing inclosing a segment of said member.

4. In an insect trap, a rotatable disk, a receiving chamber mounted adjacent to a portion of said disk, means for rotating said disk, a compartment for insect enticing substance mounted on said disk, and an additional container for said substance extending under the lower surface of said disk.

5. In an insect trap, a rotatable disk, a receiving chamber mounted adjacent to a portion of said disk, means for rotating said disk, a compartment for insect enticing substance mounted on said disk, a container for semi-liquid odoriferous material extending under the lower surface of said disk, and means for preventing the flow of said liquid.

WILLIAM M. MURPHY.
JOHN J. REDNER.

Witnesses:
C. F. Hamons,
Oliver Williams.

Copies of this patent may be obtained for five cents each, by addressing the "Commissioner of Patents, Washington, D. C."